United States Patent
Cooper (10) Patent No.: US 6,634,603 B2
(45) Date of Patent: Oct. 21, 2003

(54) MAGNETIC DIPOLE TRACTOR BEAM CONTROL SYSTEM

(75) Inventor: John Hutton Cooper, Mountain View, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/997,692

(22) Filed: Nov. 29, 2001

(65) Prior Publication Data

US 2003/0098394 A1 May 29, 2003

(51) Int. Cl.⁷ .................................................. B64G 1/24
(52) U.S. Cl. ....................................................... 244/166
(58) Field of Search ................................ 244/164, 166; 701/13

(56) References Cited

U.S. PATENT DOCUMENTS

| | | | | |
|---|---|---|---|---|
| 3,429,524 A | * | 2/1969 | Buckingham et al. ...... | 244/166 |
| 5,788,188 A | * | 8/1998 | Damilano .................... | 244/165 |
| 6,089,510 A | | 7/2000 | Villani et al. ................ | 244/166 |
| 6,330,987 B1 | * | 12/2001 | Scott ....................... | 244/158 R |

* cited by examiner

*Primary Examiner*—Robert P. Swiatek
(74) *Attorney, Agent, or Firm*—Terje Gudmestad, Esq.

(57) ABSTRACT

Spacecraft maneuvers (e.g., orbit transferring, stationkeeping and attitude controlling) of a first spacecraft are realized with conventional force and torque generators (e.g., thrusters and momentum wheels). Spacecraft maneuvers of a second spacecraft are realized through magnetic interaction between the first and second spacecraft using a closed loop control system. In particular, a magnetic moment vector $m_1$ of a magnetic system of the first spacecraft and a magnetic moment vector $m_2$ of a magnetic system of the second spacecraft are adjusted to apply selected force vectors and torque vectors to the first and second spacecraft using a closed loop control system.

27 Claims, 5 Drawing Sheets

MAGNETIC DIPOLE TRACTOR BEAM CONTROL SYSTEM

TECHNICAL FIELD

The present invention relates generally to satellite maneuvering systems, and more particularly, to a magnetic dipole tractor beam control system.

BACKGROUND ART

Spacecraft are directed through various maneuvers to guide them along a variety of celestial paths (e.g., interplanetary voyages and orbits around astronomical bodies such as the Earth) to perform a variety of functions (e.g., weather or planet surface monitoring, commercial communications and scientific observations). These spacecraft maneuvers include ones which initially place a spacecraft in a predetermined celestial path, ones which maintain a desired spacecraft station in the celestial path and ones which maintain a desired spacecraft attitude in the celestial path. In an exemplary case in which the celestial path is a geosynchronous Earth orbit, these spacecraft maneuvers are typically referred to as orbital transferring, stationkeeping and attitude controlling.

Spacecraft maneuvers are accomplished by the application of forces and torques to the spacecraft. Typically, orbital transferring and stationkeeeping are achieved by directing force vectors through the center of mass of spacecraft so as to obtain changes in spacecraft position without disturbing spacecraft attitude. In contrast, attitude controlling is typically achieved by spacing force vectors from the center of mass to thereby generate torque vectors which realize attitude changes.

Conventional spacecraft structures for application of spacecraft forces and torques include thrusters, momentum and reaction wheels, surfaces which receive solar pressure (e.g., solar cell arrays), extended masses which interact with ambient gravity gradients, mechanical inter-spacecraft control structures (e.g., mechanical arms) and magnetic torquing coils which interact with ambient magnetic fields (e.g., the Earth's magnetic field).

Although all of these control structures have been used to effect spacecraft maneuvers, each has characteristics that limit their usefulness. Thruster systems are typically bulky, heavy and expel propellant products which can coat and degrade sensitive spacecraft structures (e.g., electro-optical instruments and solar cell arrays). In addition, fuel is an expendable substance of limited supply and, hence, its lack routinely produces the effective end of useful spacecraft life. Momentum and reaction wheels are restricted to the application of torques and their momentum must be periodically "dumped" with other control structures (e.g., limited-fuel thrusters) when it approaches the design limit of the wheels.

Generation of spacecraft forces and spacecraft torques by use of solar pressure and ambient gravity gradients typically requires the arrangement or deployment of mechanical structures (e.g., selective rotation of solar cell arrays or extension of gravitational masses from the spacecraft on booms or tethers). Alternatively, generation of spacecraft forces and spacecraft torques can be effected with the limited quantity of thruster fuel.

Inter-spacecraft mechanical control structures are typically bulky and heavy which means they use a significant amount of spacecraft volume and weight (quantities which are always in short supply). Such structures can only be applied when the spacecraft spacing is less than the maximum reach of the control structures. In addition, direct-contact mechanical control may initiate a damaging electrostatic discharge because of spacecraft potential differences, may cause mechanical damage and may respond to electrical or mechanical failure by failing to uncouple the spacecrafts.

The application of magnetic fields to spacecraft maneuvers has typically been directed to the use of ambient magnetic fields (e.g., the Earth's magnetic field) or to the theoretical use of magnetic structures that have been previously distributed in orbit about a celestial body (e.g., see Lebon, Benoit A., "Magnetic Propulsion along an Orbiting Grain Stream", Journal of Spacecraft and Rockets, Vol. 23, March-April, 1986, pp. 141–143).

The forces and torques generated in magnetic structures by an ambient magnetic field have been generally described by many investigators (e.g., see Boyer, Timothy H., "The Force on a Magnetic Dipole", American Journal of Physics, August 1988, Vol. 56, No. 8, pp. 688–692; Brownstein, K. R., "Force Exerted on a Magnetic Dipole", American Journal of Physics, October 1993, Vol. 61, No. 10, pp. 940–941); Greene, Jack B., et al., "Force on a Magnetic Dipole", American Journal of Physics, February 1971, Vol. 39, pp. 172–175; Hnizdo, V., "Hidden Momentum and the Force on a Magnetic Dipole", Magnetic and Electrical Separation, 1992, Vol. 3, pp. 259–265; and Vaidman, Lev, "Torque and Force on a Magnetic Dipole", American Journal of Physics, October 1990, Vol. 58, No. 10, pp. 978–983).

Magnetic forces on neutrally charged objects are not induced by uniform magnetic fields. Accordingly, ambient magnetic fields cannot be used to generate forces on spacecraft because they are essentially uniform at the spatial scale of spacecraft. In addition, the generation of torques with an ambient magnetic field is limited in application because the direction of the ambient magnetic field gradient cannot be selected.

U.S. Pat. No. 6,089,510 teaches using a magnetic dipole for spacecraft maneuvers. In the '510 patent, spacecraft maneuvers of a first spacecraft are realized with conventional force and torque generators. Spacecraft maneuvers of a second spacecraft are realized through magnetic interaction between the first and second spacecraft. In particular, a magnetic moment vector $m_1$ of a magnetic system of the first spacecraft and a magnetic moment vector $m_2$ of a magnetic system of the second spacecraft are adjusted to apply selected force vectors and torque vectors to the first and second spacecraft. Unfortunately, the system described in the '510 patent uses open loop control.

The disadvantages associated with these conventional magnetic maneuvering techniques have made it apparent that a new technique for control of a magnetic dipole tractor beam is needed. Preferably, the new technique would provide closed loop control of a magnetic dipole tractor beam. The present invention is directed to these ends.

SUMMARY OF THE INVENTION

It is, therefore, an object of this invention to provide an improved and reliable magnetic dipole tractor beam control system. Another object of the invention is to provide closed loop control of a magnetic dipole tractor beam.

In accordance with the objects of this invention, a magnetic dipole tractor beam control system is provided. In one embodiment of the invention, spacecraft maneuvers (e.g., orbit transferring, stationkeeping and attitude controlling) of a first spacecraft are realized with conventional force and torque generators (e.g., thrusters and momentum wheels).

Spacecraft maneuvers of a second spacecraft are realized through magnetic interaction between the first and second spacecraft using a closed loop control system. In particular, a magnetic moment vector $m_1$ of a magnetic system of the first spacecraft and a magnetic moment vector $m_2$ of a magnetic system of the second spacecraft are adjusted to apply selected force vectors and torque vectors to the first and second spacecraft using a closed loop control system.

The present invention thus achieves an improved magnetic dipole tractor beam control system. The present invention is advantageous in that it is capable of providing closed loop control of a magnetic dipole tractor beam.

Additional advantages and features of the present invention will become apparent from the description that follows and may be realized by means of the instrumentalities and combinations particularly pointed out in the appended claims taken in conjunction with the accompanying drawings.

BRIEF DESCRIPTION OF THE DRAWINGS

In order that the invention may be well understood, there will now be described some embodiments thereof taken by way of example, reference being made to the accompanying drawings in which.

BEST MODES FOR CARRYING OUT THE INVENTION

In the following Figures, the same reference numerals will be used to identify identical components of the various views. The present invention is illustrated with respect to a magnetic dipole tractor beam control system particularly suited for the aerospace field. However, the present invention is applicable to various and other uses that may require a magnetic dipole tractor beam control system.

Figure 1:
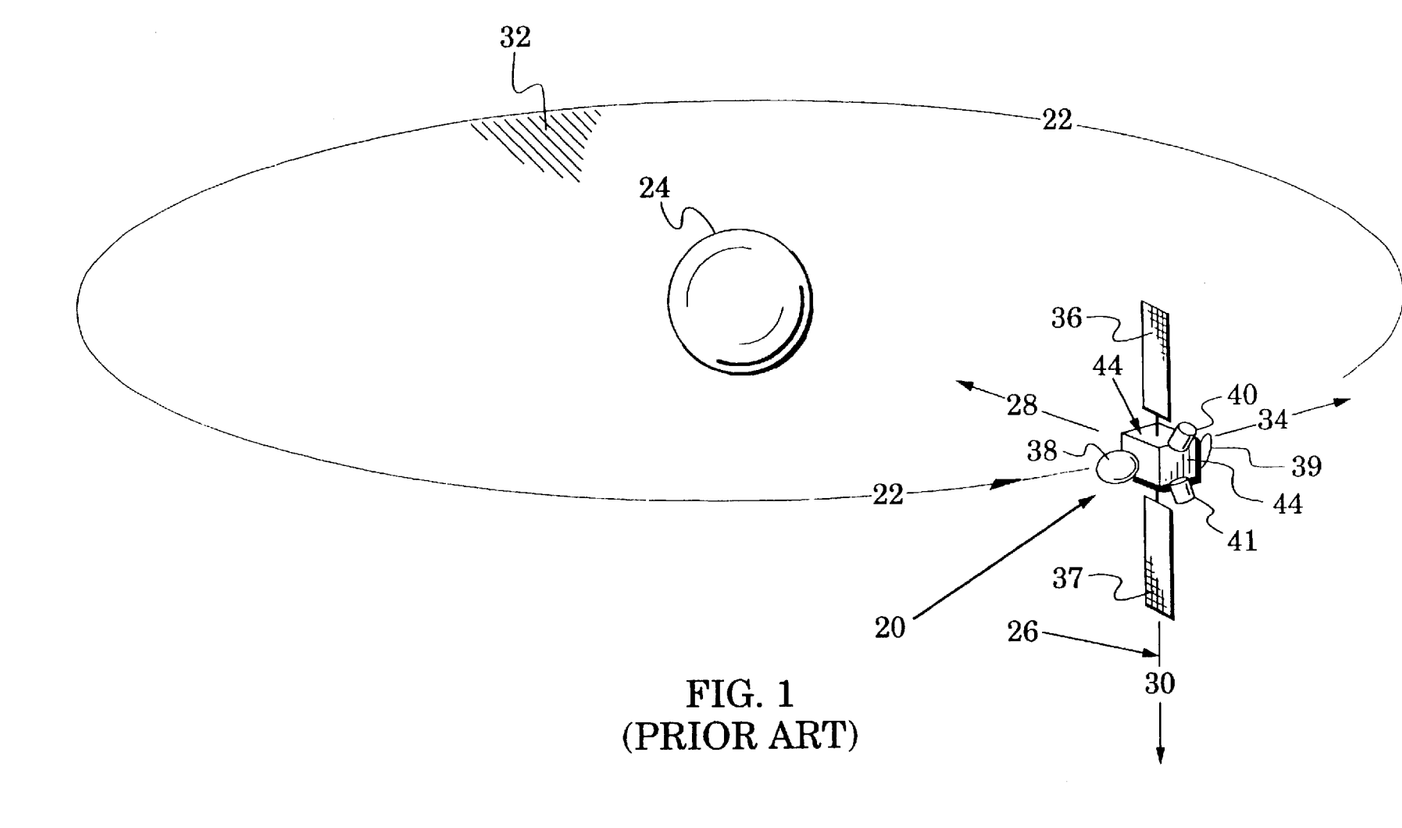
FIG. 1 is perspective view of a spacecraft in an orbital plane about a celestial body.

FIG. 1 illustrates a spacecraft 20, which is traveling along a celestial path. In this exemplary illustration, the celestial path is an orbit 22 about the Earth 24 and the spacecraft is a body-stabilized spacecraft whose attitude can be defined relative to an orthogonal coordinate system 26. The coordinate system 26 has an origin at the spacecraft's center of mass and includes a yaw axis 28 which is directed from the origin towards the center of the Earth 24. A pitch axis 30 is orthogonal to the spacecraft's orbital plane 32 and a roll axis 34 is aligned with the satellite's velocity vector.

Solar cell arrays 36 and 37 typically extend from the spacecraft so that they can rotate about some selected axis (frequently the pitch axis 30) to enhance their exposure to the Sun. Antennas (e.g., the antennas 38 and 39) are usually directed towards the Earth for communication and thrusters 40 and 41 are carried on the spacecraft's body 44 to facilitate stationkeeping and attitude control.

Figure 2:
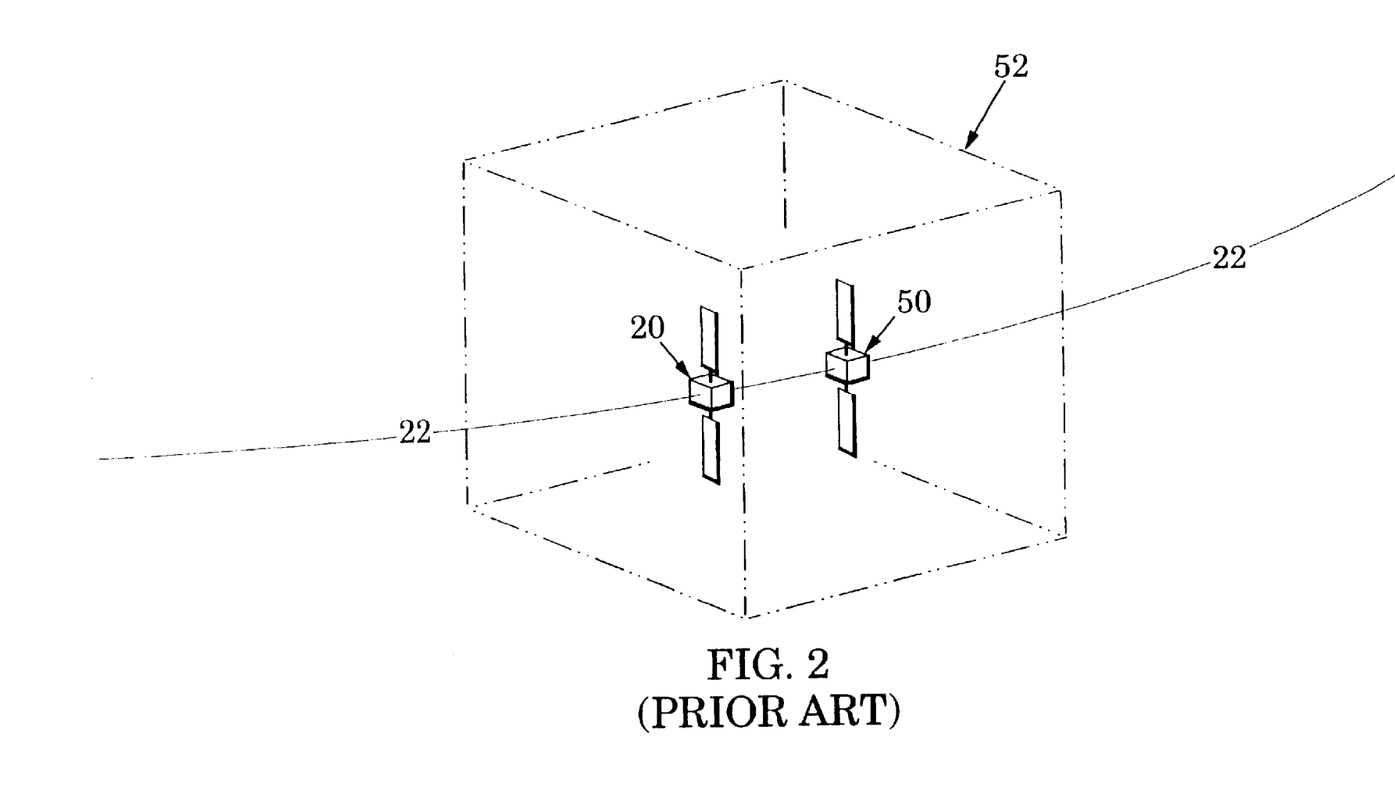
FIG. 2 is a simplified, perspective view of the spacecraft of FIG. 1 which shows it co-located with another spacecraft in an orbital box.

An exemplary use of the present invention applies to geosychronous satellites on station. To prevent conflict or collision with other spacecraft, the spacecraft 20 of FIG. 1 is typically restricted to movement within an orbital "box" which has a predetermined longitudinal location on the orbit 22. Orbital boxes are generally assigned to commercial or governmental entities which may sometimes be free to co-locate a plurality of spacecraft within an assigned box. For example, FIG. 2 illustrates the spacecraft 20 and a similar spacecraft 50 that are co-located within an orbital box 52 (details of the spacecraft 20 are not shown in FIG. 2 for simplicity of illustration).

If the spacecraft 20 and 50 are to be kept within the orbital box 52 and also kept safely spaced apart, a control system is required which can apply control forces to the spacecraft. Preferably, the control system can also apply control torques to the spacecraft 20 and 50 so that their attitudes can be selected to enhance their operation, e.g., to direct spacecraft antennas (38 and 39 in FIG. 1) at the Earth (24 in FIG. 1).

Figure 3:
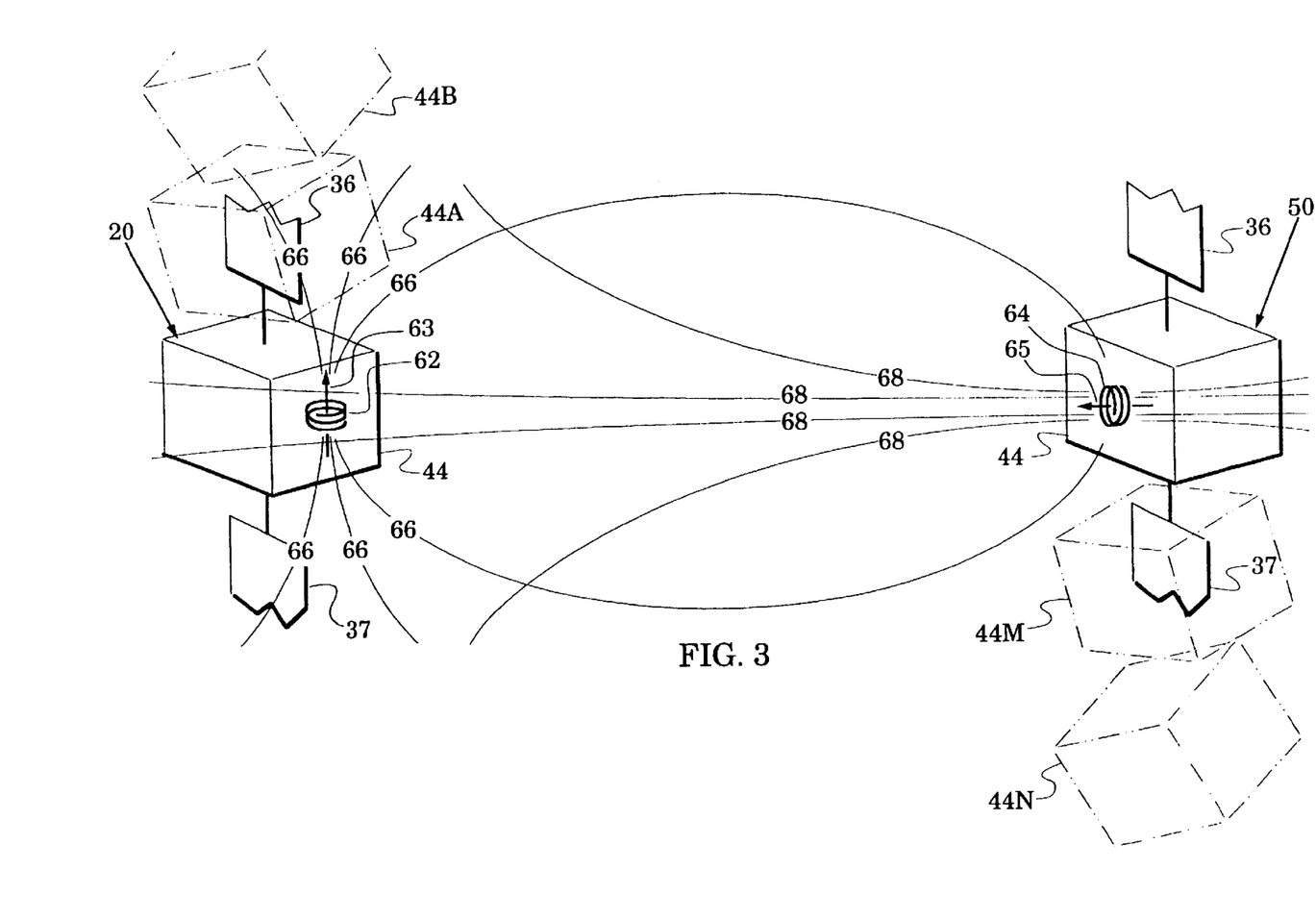
FIG. 3 is an enlarged view of bodies of the spacecraft of FIG. 3 which illustrates methods of the present invention for orienting magnetic moments to generate control forces and torques.

FIG. 3 is an enlarged view of the spacecraft 20 and 50 which illustrates a control system of the present invention. The system includes magnetic members 62 and 64 which are respectively positioned in the bodies 44 of the spacecraft 20 and 50. Although the teachings of the invention can be practiced with any magnetic members (e.g., magnets and current-carrying coils), the members 62 and 64 are each indicated to be current-carrying coils.

The magnetic members 62 and 64 have selectable magnetic moment vectors 63 and 65 whose direction and strength are respectively indicated by the orientation and length of their vector arrows. As is well known, a magnetic moment vector m is the ratio of the maximum torque $T_{max}$ exerted on a magnetic member to the strength B of a magnetic field in which the magnetic member is immersed (i.e., $m = T_{max}/B$). The maximum torque exists when the magnetic moment vector is orthogonal to the magnetic field. For example, the magnetic moment m of a coil of N turns and area A which carries a current I is given by $m = NAI$.

In the exemplary arrangement of FIG. 3, the magnetic moment vectors are arranged in an orthogonal relationship. In particular, the magnetic moment vector 63 of the magnetic member 62 is directed upwards and the magnetic moment vector 65 of the magnetic member 64 is directed towards the spacecraft 20 (i.e., directed to the left). Magnetic flux lines 66 from the magnetic member 62 project outward to envelope the magnetic member 64 (for clarity of illustration, discrete magnetic flux lines are used to indicate the presence of the magnetic field of magnetic members). Similarly, magnetic flux lines 68 from the magnetic member 64 project outward to envelope the magnetic member 62.

As a result of the orthogonal relationship between the magnetic moment vectors 63 and 65, forces are exerted on spacecraft 20 and 50 which cause them to accelerate respectively upward and downward. In addition, the orthogonal relationship exerts similar torques on the spacecraft 20 and 50 which causes similar rotations (e.g., counterclockwise when viewed from the top of FIG. 3). To illustrate this motion, two successive, broken-line positions 44A and 44B are shown for the body 44 of the spacecraft 20 and two successive, broken-line positions 44M and 44N are shown for the body 44 of the spacecraft 50.

Figure 4:
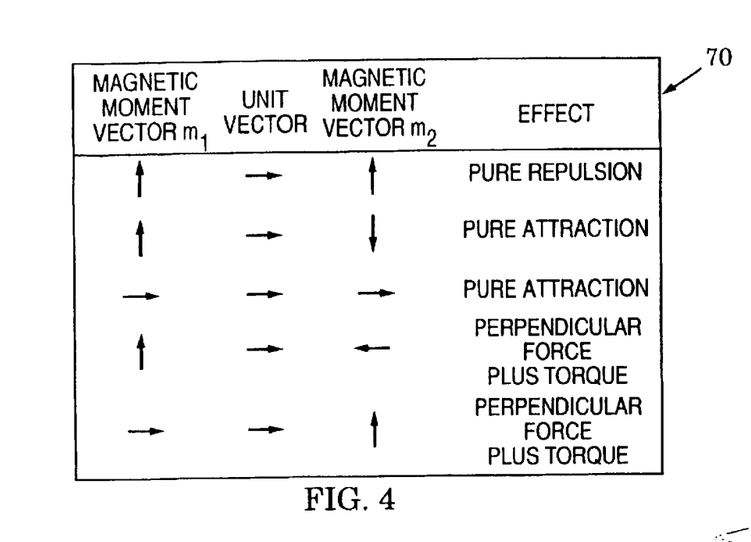
FIG. 4 is a chart which illustrates exemplary orientations of the magnetic moments of FIG. 3.

The table 70 of FIG. 4 shows several exemplary arrangements of magnetic moment vectors 63 and 65 and the resulting forces and torques. In a first example of the table, side-by-side and parallel magnetic moment vectors generate pure repulsion forces between the magnetic members. In a second example, side-by-side and parallel but opposite magnetic moment vectors generate pure attraction forces between the magnetic members. In a third example, colinear and similarly-directed magnetic moment vectors generate pure attraction forces between the magnetic members. Although not shown, colinear and oppositely-directed magnetic moment vectors generate pure repulsion forces. The last two arrangement examples of the table 70 show that orthogonally-arranged magnetic moment vectors generate both forces and torques.

In particular, it has been determined that a force vector $F_{12}$ which is exerted on a first spacecraft that carries a magnetic moment vector $m_1$ by a second spacecraft that carries a magnetic moment vector m.sub.2 is given by $$F_{12} = \frac{k}{r^4}\{(e_{12} \times m_1) \times m_2 + (e_{12} \times m_2) \times m_1 - 2e_{12}(m_1 \cdot m_2) + 5e_{12}(e_{12} \times m_1) \cdot (e_{12} \times m_2)\}$$

in units of Newtons and in which the constant $k=3\mu_o/4\pi=3.0\times10^{-7}$ Newton-Ampere$^{-2}$ ($\mu_o$ being the permeability of free space), r is a scalar which represents the separation distance between the two spacecraft, $e_{12}$ is a unit vector directed towards the first spacecraft from the second spacecraft, × represents a cross product (i.e., a vector product) operation and · represents a dot product (i.e., a scalar product) operation. A force vector $F_{21}$ exerted on the second spacecraft by the first spacecraft is given by $$F_{21} = -F_{12}$$

In general, a torque vector $T_{12}$ which is exerted on the first spacecraft is not equal to a torque vector $T_{21}$ which is exerted on the second spacecraft. These torques can be calculated and an exemplary torque vector $T_{12}$ has been determined to be $$T_{12} = \frac{k}{3r^3}\{3(m_2 \cdot e_{12})(m_1 \times e_{12}) - (m_1 \times m_2)\}$$

in units of Newton-meter.

As is well known, a force vector urges a body to accelerate linearly in the direction of the force vector and a torque vector urges a body to accelerate its rotation about the vector in an angular direction given by the right hand rule (i.e., if the thumb of the right hand points in the direction of the torque vector, the fingers of the right hand indicate the urged rotation direction). The equations recited above (and the exemplary arrangements of the table 70 of FIG. 4) indicate that pure forces can be generated by the invention so that spacecraft can be maneuvered without disturbing their attitude. In addition, attitude-changing torques can be generated by the invention but they are accompanied by position-changing forces. However, these effects can be followed with the application of subsequent pure forces that restore an original position relationship. Although FIGS. 3 and 4 illustrate the teachings of the invention with reference to two spacecraft, these teachings are applicable to any number of spacecraft or to one spacecraft successively controlling a plurality of other spacecraft.

As an indication of scale, exemplary spacecraft magnetic torquing coils have magnetic moments in the range of 1000 Ampere$^{-2}$. If a pair of spacecraft each carried a coil with this strength of magnetic moment, the magnetic moments were arranged as in the first arrangement of the table 70 of FIG. 4 and the two spacecraft were separated by 4 meters (i.e., r=4 meters), then $F_{12}=1.2\times10^{-3}$ Newtons. Alternatively, if the magnetic moments were arranged as in the last arrangement of the table 70 of FIG. 4, then $T_{12}=1.6\times10^{-3}$ Newton-meters.

These are small forces and torques which respectively decline with the fourth and third power of the separation distance r. However, they can be integrated over long time periods because of the typically long time durations of spacecraft travel (e.g., time in orbit). Accordingly, it is theorized that they can achieve forces comparable to those obtained with electrostatic ion thrusters and torques well above those obtained with typical ambient geomagnetic fields at the elevation of a geosynchronous orbit.

Figure 5A:
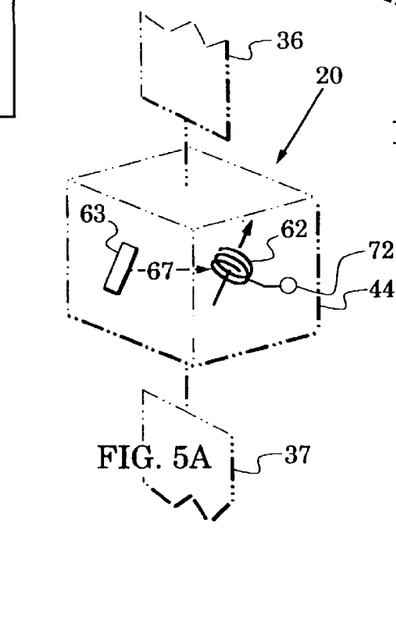
FIG. 5A is a view of one of the spacecraft of FIG. 3 which illustrates an exemplary magnetic system.

In FIG. 5A, the spacecraft 20 of FIG. 3 is modified to show that the magnetic member 62 can be carried on a gimbal so that it can be selectively directed in any direction. Because there are a great number of conventional gimbal structures, they are represented in FIG. 5A by a simple ball mount 72. Although the magnetic member 62 is indicated as a current-carrying coil, the coil can be replaced by a magnet 63 as indicated by a replacement arrow 67.

Figure 5B:
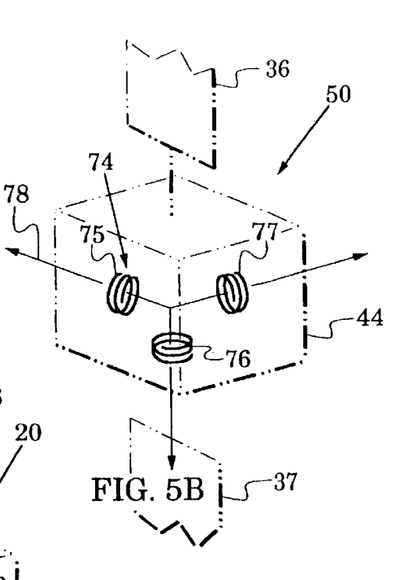
FIG. 5B is a view similar to FIG. 5A which illustrates another exemplary magnetic system.

Alternatively, FIG. 5B illustrates that an equivalent magnetic system 74 can be formed with a plurality of magnetic members 75, 76 and 77 which are arranged so that their individual magnetic moments can form any composite magnetic moment in three-dimensional space. Preferably, the magnetic members are arranged in an orthogonal relationship. Because appropriate adjustments of the magnetic moments of these magnetic members can realize any magnetic moment, the need for movable magnetic members is avoided. For backup redundancy, a fourth magnetic member can be positioned so that it is not orthogonal to any of the magnetic members 75, 76 and 77. The teachings of the invention can be practiced with any of various magnetic member orientations that can define magnetic moments in three-dimensional space (e.g., four magnetic members arranged in a pyramidal shape).

Figure 6:
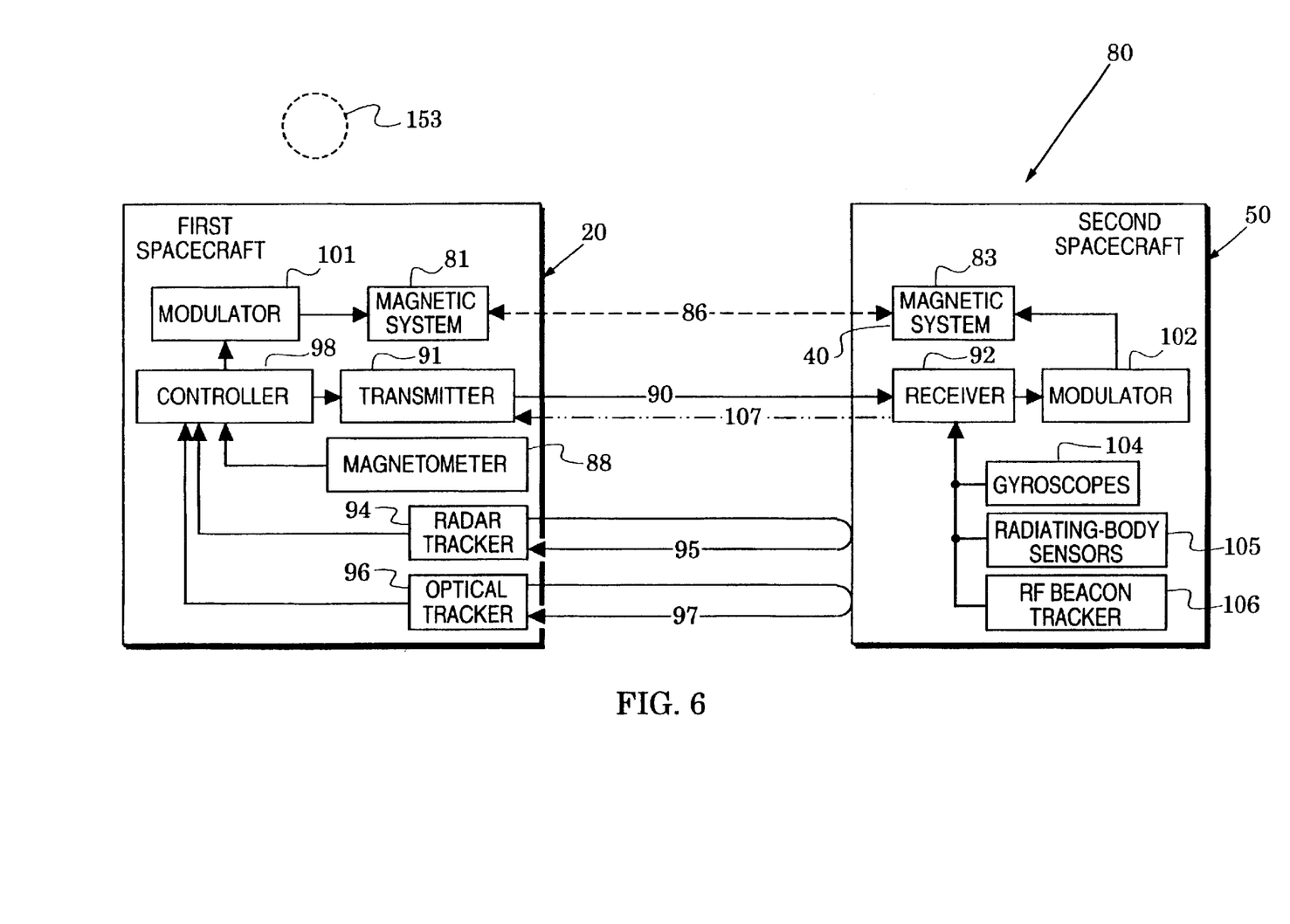
FIG. 6 is a block diagram of a control system of the present invention.

A spacecraft control system 80 of the invention is shown in FIG. 6. The system 80 includes magnetic systems 81 and 83 which are carried respectively in first and second spacecraft (e.g., the spacecraft 20 and 50 of FIG. 3). These magnetic systems may comprise, for example, the gimballed magnetic member 62 of FIG. 5A or the magnetic system 74 of FIG. 5B. Each of the magnetic systems 81 and 83 can interact with the magnetic field that is generated by the other of the magnetic systems. This magnetic interaction is symbolized in FIG. 6 by the broken line 86.

The first spacecraft 20 also carries a magnetometer 88 for sensing the magnetic fields of the magnetic systems 81 and 83. An exemplary magnetometer would include individual magnetometers arranged in an orthogonal relationship (similar to that of the magnetic system 74 of FIG. 3) or a magnetometer configured for three-axis sensing.

Commands to adjust the magnetic moment of the magnetic member 83 are communicated through a communication link 90 that includes a transmitter 91 in the spacecraft 20 and a receiver 92 in the spacecraft 50 with the magnetic moment of the magnetic system 83 being responsive to the receiver 92.

The separation distance between the first and second spacecraft is detected with a tracker system (e.g., a radar tracker 94 which detects reflected radar signals 95 or an optical tracker 96 which detects reflected optical signals 97 and/or the magnetometer 88). The tracker system can provide the separation distance r which was included in the equations recited above for determining forces $F_{12}$ and $F_{21}$ and torques $T_{12}$ and $T_{21}$.

A controller 98 (e.g., a microprocessor) is carried in the first spacecraft 20 to be responsive to inputs from the radar tracker 94 (or the optical tracker 96) and the magnetometer 88. In turn, the controller 98 sends commands to the magnetic system 81 and to the magnetic system 83 through the communication link 90

To enhance the ability of the control system 80 to distinguish between different magnetic fields, the magnetic members 81 and 83 can be modulated (e.g., pulsed). Accordingly, modulators 101 and 102 are inserted so that commands to the magnetic systems 81 and 83 are communicated through the modulators.

In operation of the control system 80, detected information about the magnetic fields of the magnetic systems 81 and 83 is communicated from the magnetometer 88 to the controller 98. If desired, the magnetic field detection is enhanced by modulating the magnetic fields via the modulators 101 and 102. Detected information concerning the separation distance between the spacecraft is communicated from the radar tracker 94 (or the optical tracker 96) to the controller 98.

The controller 98 can be preprogrammed to perform various spacecraft maneuvers, e.g., to maintain a fixed separation distance or to maintain a relative attitude between spacecraft. With inputs concerning the magnetic moments m.sub.1 and m.sub.2 and the separation distance r, the controller 98 can be programmed (in accordance with the force and torque equations recited above) to determine the forces and torques required to perform the programmed maneuvers. Alternatively, the controller 98 can be commanded (via a conventional data link to the spacecraft 20) to perform spacecraft maneuvers other than preprogrammed maneuvers.

Two bodies, A and B, each exist in their respective frames, possess masses $n_a$ and $n_b$, are located at positions $r_a$ and $r_b$, and carry dipole moments $m_a$ and $m_b$. Body A is the towing spacecraft, and body B is the target spacecraft. The magnetic dipole imposes forces $F_a$ and $F_b$ on bodies A and B, respectively. In addition, Body A is acted upon by some external force $F_{ext}$ stemming from thrusters. Newton's first law gives:

$$F_a + F_{ext} = n_a \ddot{r}_a$$

$$F_b = n_b \ddot{r}_b$$

These equations are written in the inertial frame. By redefining a new vector as the relative position of the bodies:

$$r = \begin{bmatrix} x \\ y \\ z \end{bmatrix} = r_b - r_a$$

Since, according to Newton's second law $F_a = -F_b$, the following equations result:

$$\ddot{r} = \ddot{r}_b - \ddot{r}_a$$
$$= \frac{1}{n_b} F_b - \frac{1}{n_a}(F_a + F_{ext})$$
$$= \left(\frac{1}{n_b} + \frac{1}{n_a}\right) f_b - \frac{1}{n_a} F_{ext}$$

$$n_a n_b \ddot{r} = (n_a + n_b) F_b - n_b F_{ext}$$

Therefore, the magnetic force on body B can be approximated as:

$$F_b = \frac{3\mu_o m_b}{4\pi r^5}[r(m_a \cdot \hat{m}_b) + m_a(r \cdot \hat{m}_b) + \hat{m}_b(r \cdot m_a) - 5r(\hat{r} \cdot m_a)(\hat{r} \cdot \hat{m}_b)]$$

where $\mu_o$ is the permeability of free space, $m_b$ is the scalar magnitude of body B's magnetic dipole moment, and the circumflex character ^ is used to indicate a unit vector. This equation is written in SI units in the inertial frame I. For convenience, a constant $\Omega$ may be defined as:

$$\Omega \equiv \frac{\mu_o m_b}{4\pi}$$

Body A is nominally aligned with the inertial frame I; deviations from this nominal alignment about the X, Y, and Z axes are given by $\theta_r^a$, $\theta_p^a$, and $\theta_y^a$, respectively. Similarly, body B is nominally aligned with inertial frame I, and its deviations are given by $\theta_r^b$, $\theta_p^b$, and $\theta_y^b$. The linearized rotation matrix $Q_B$ maps vectors from frame B into I:

$$Q_B = \begin{bmatrix} 1 & -\theta_y^b & \theta_p^b \\ \theta_y^b & 1 & -\theta_r^b \\ -\theta_p^b & \theta_r^b & 1 \end{bmatrix}$$

The magnetic dipole of body B in the inertial frame is given by:

$$m_b^I = m_b Q_B \begin{bmatrix} 0 \\ 0 \\ 1 \end{bmatrix}.$$

Consequently, $$\hat{m}_b^I = Q_b \begin{bmatrix} 0 \\ 0 \\ 1 \end{bmatrix} = \begin{bmatrix} \theta_p^b \\ -\theta_r^b \\ 1 \end{bmatrix}$$

The nominal relative position is:

$$r_{nom} = \begin{bmatrix} 0 \\ 0 \\ z_o \end{bmatrix}$$

The magnetic dipole moment of body A in inertial coordinates is given by:

$$m_a^I = \begin{bmatrix} m_1^I \\ m_2^I \\ m_3^I \end{bmatrix}$$

The nominal value of this dipole moment is:

$$m_{a,nom}^l = \begin{bmatrix} 0 \\ 0 \\ m_o \end{bmatrix}$$

Therefore, the force equation can be written:

$$F_b = \frac{3\Omega}{r^5}\left[\begin{bmatrix} x \\ y \\ z \end{bmatrix}\left(\begin{bmatrix} m_1^l \\ m_2^l \\ m_3^l \end{bmatrix}^T \begin{bmatrix} \theta_p^b \\ -\theta_r^b \\ 1 \end{bmatrix}\right) + \begin{bmatrix} m_1^l \\ m_2^l \\ m_3^l \end{bmatrix}\left(\begin{bmatrix} x \\ y \\ z \end{bmatrix}^T \begin{bmatrix} \theta_p^b \\ -\theta_r^b \\ 1 \end{bmatrix}\right) + \begin{bmatrix} \theta_p^b \\ -\theta_r^b \\ 1 \end{bmatrix}\left(\begin{bmatrix} x \\ y \\ z \end{bmatrix}^T \begin{bmatrix} m_1^l \\ m_2^l \\ m_3^l \end{bmatrix}\right)\right] -$$

$$\frac{15\Omega}{r^7}\begin{bmatrix} x \\ y \\ z \end{bmatrix}\left(\begin{bmatrix} x \\ y \\ z \end{bmatrix}^T \begin{bmatrix} m_1^l \\ m_2^l \\ m_3^l \end{bmatrix}\right)\left(\begin{bmatrix} x \\ y \\ z \end{bmatrix}^T \begin{bmatrix} \theta_p^b \\ -\theta_r^b \\ 1 \end{bmatrix}\right)$$

Linearizing this equation with respect to the state vector:

$$q = \begin{bmatrix} x \\ y \\ \Delta z \end{bmatrix}$$

where $\Delta z = z - z_o$. The control vector body B dipole moment in inertial space, given by:

$$u = \begin{bmatrix} m_1 \\ m_2 \\ \Delta m \end{bmatrix}$$

where $\Delta m = m_3 - m_o$. The nominal force works out to:

$$F_{b,nom} = \frac{-6\Omega m_o}{z_o^4}\begin{bmatrix} 0 \\ 0 \\ 1 \end{bmatrix}$$

In order to be able to linearize about $r_{nom}$, it is required that the relative acceleration between the bodies be zero at nominal separation:

$$\ddot{r}_{nom} = \begin{bmatrix} 0 \\ 0 \\ 0 \end{bmatrix}.$$

As a result, $$\begin{bmatrix} 0 \\ 0 \\ 0 \end{bmatrix} = (n_a + n_b)F_{b,nom} - n_b F_{ext}$$

$$F_{ext} = \frac{(n_a + n_b)}{n_b}F_{b,nom}$$

Linearizing the force equation with respect to the state vector yields:

$$F_b = F_{b,nom} + K_r q + B_r u$$

$$K_r = \begin{bmatrix} \frac{-12\Omega m_o}{z_o^5} & 0 & 0 \\ 0 & \frac{-12\Omega m_o}{z_o^5} & 0 \\ 0 & 0 & \frac{24\Omega m_o}{z_o^5} \end{bmatrix}$$

$$B_r = \begin{bmatrix} \frac{3\Omega}{z_o^4} & 0 & 0 \\ 0 & \frac{3\Omega}{z_o^4} & 0 \\ 0 & 0 & \frac{-6\Omega}{z_o^4} \end{bmatrix}$$

Therefore, $$M_r \ddot{r} = K_r q + B_r u$$

$$M_r = \frac{n_a n_b}{(n_a + n_b)}\begin{bmatrix} 1 & 0 & 0 \\ 0 & 1 & 0 \\ 1 & 0 & 1 \end{bmatrix}$$

rewriting this second equation into first order form:

$$\dot{x} = Ax + Bu$$

$$x = \begin{bmatrix} q \\ \dot{q} \end{bmatrix} = \begin{bmatrix} x \\ y \\ \Delta z \\ \dot{x} \\ \dot{y} \\ \frac{d}{dt}\Delta z \end{bmatrix}$$

$$A = \begin{bmatrix} 0 & I \\ M_r^{-1}K_r & 0 \end{bmatrix}$$

$$B = \begin{bmatrix} 0 \\ M_r^{-1}B_r \end{bmatrix}$$

Now constructing a control law to control the relative positions of the two bodies. The three loops separate neatly, and each can be designed independently.

If a desired settling time of $T_s$ and a damping ratio of $\xi$ is required, then the settling time may be approximated by:

$$T_s = \frac{4}{\omega_n \xi}$$

where $\omega_n$ is the natural frequency of the system. Thus, $$\omega_n = \frac{4}{T_s \xi}$$

The desired closed loop second order system for each axis is:

$$\dot{X}_i = DX_i$$

where the D matrix gives the desired second order response:

$$D = \begin{bmatrix} 0 & 1 \\ -\omega_n^2 & 2\omega_n \xi \end{bmatrix}$$

and $X_I$ is the state vector for each axis:

$$X_1 = \begin{bmatrix} x \\ \dot{x} \end{bmatrix}$$

$$X_2 = \begin{bmatrix} y \\ \dot{y} \end{bmatrix}$$

$$X_3 = \begin{bmatrix} z - z_o \\ \dot{z} \end{bmatrix}$$

$$\dot{X}_i = A_i X_i + \begin{bmatrix} 0 \\ b_i \end{bmatrix} u_i$$

The plant for each axis is given by:

$$A_1 = \begin{bmatrix} A_{11} & A_{14} \\ A_{41} & A_{44} \end{bmatrix}$$

$$A_2 = \begin{bmatrix} A_{22} & A_{25} \\ A_{52} & A_{55} \end{bmatrix}$$

$$A_3 = \begin{bmatrix} A_{33} & A_{36} \\ A_{63} & A_{66} \end{bmatrix}$$

$$b_1 = B_{41}$$

$$b_2 = B_{52}$$

$$b_3 = B_{63}$$

The equation for control is therefore:

$$u = -g_i^T X_i$$

where $g_i$ is a 2 by 1 gain vector. The task is to find a gain vector $g_i$ that satisfies:

$$\dot{X}_i = A_i X_i - \begin{bmatrix} 0 \\ b_i \end{bmatrix} g_i^T X_i = \left(A_i - \begin{bmatrix} 0 \\ b_i \end{bmatrix} g_i^T\right) X_i = D X_i$$

This can be accomplished by:

$$g_i^T = \begin{bmatrix} 0 & \dfrac{1}{b_i} \end{bmatrix}(A_i - D)$$

Thus the magnetic dipole control law is given by:

$$m_a^I = \begin{bmatrix} m_1^I \\ m_2^I \\ m_3^I \end{bmatrix} = \begin{bmatrix} 0 \\ 0 \\ m_o \end{bmatrix} - GX$$

$$G = \begin{bmatrix} g_1(1) & 0 & 0 & g_1(2) & 0 & 0 \\ 0 & g_2(1) & 0 & 0 & g_2(2) & 0 \\ 0 & 0 & g_3(1) & 0 & 0 & g_3(2) \end{bmatrix}$$

$$X = \begin{bmatrix} x \\ y \\ \Delta z \\ \dot{x} \\ \dot{y} \\ \dfrac{d}{dt}\Delta z \end{bmatrix}$$

From the foregoing, it can be seen that there has been brought to the art a new and improved magnetic dipole tractor beam control system. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A method of applying control forces and control torques to spacecraft, comprising the steps of:
   from first and second spacecraft, respectively projecting first and second magnetic fields to magnetically interact wherein said first and second magnetic fields are respectively represented by first and second magnetic moment vectors;
   orienting said first and second magnetic fields to realize a selected arrangement of said first and second magnetic moment vectors and thereby a corresponding application of at least one of a selected control force and a selected control torque to each of said first and second spacecraft;
   monitoring said first and second magnetic fields, said first and second magnetic moment vectors, and said selected control force and torque; and
   modifying said and second magnetic fields, said first and second magnetic moment vectors, and said selected control force and torque using a closed-loop control law to control a relative position of said first and second spacecraft.

2. The method of claim 1, wherein said selected arrangement places said first and second magnetic moment vectors in a parallel and similarly-directed relationship and said corresponding application applies a repulsion force between said first and second spacecraft.

3. The method of claim 1, further including the step of changing a field strength of at least one of said first and second magnetic fields to selectively alter at least one of said control force and said control torque.

4. The method of claim 1, wherein said selected arrangement places said first and second magnetic moment vectors in a parallel and oppositely-directed relationship and said corresponding application applies an attraction force between said first and second spacecraft.

5. The method of claim 1, wherein said selected arrangement places said first and second magnetic moment vectors in a colinear and similarly-directed relationship and said corresponding application applies an attraction force between said first and second spacecraft.

6. The method of claim 1, wherein said selected arrangement places said first and second magnetic moment vectors in a colinear and oppositely-directed relationship and said corresponding application applies a repulsion force between said first and second spacecraft.

7. The method of claim 1, wherein said selected arrangement places said first and second magnetic moment vectors in an orthogonal relationship and said corresponding application applies oppositely-directed forces and similarly-directed torques to said first and second spacecraft.

8. The method of claim 1, wherein said closed-loop control law is $$m_a^l = \begin{bmatrix} m_1^l \\ m_2^l \\ m_3^l \end{bmatrix} = \begin{bmatrix} 0 \\ 0 \\ m_o \end{bmatrix} - GX.$$

9. A method of applying control forces and control torques to spacecraft, comprising the steps of:
projecting a first magnetic field from a first magnetic system of a first spacecraft to magnetically interact with a second magnetic system of a second spacecraft and thereby apply at least one of a control force and a control torque to said second spacecraft; and
projecting a second magnetic field from said second magnetic system to magnetically interact with said first magnetic system and thereby apply at least one of a control force and a control torque to said first spacecraft;
wherein:
said first magnetic system has a magnetic moment vector $m_1$ and
said second magnetic system has a second magnetic moment vector $m_2$;
and further including the step of adjusting at least one of said first magnetic moment vector $m_1$ and said second magnetic moment vector $m_2$ to realize a selected force vector $F_{12}$ on said first spacecraft and a selected force vector $F_{21}$ on said second spacecraft in accordance with the following equations:

a) $F_{12} = \dfrac{k}{r^4}\{(e_{12} \times m_1) \times m_2 + (e_{12} \times m_2) \times m_1 -$
$2e_{12}(m_1 \cdot m_2) + 5e_{12}(e_{12} \times m_1) \cdot (e_{12} \times m_2)\}$ which a constant $k=3\mu_o/4\pi=3.0\times10^{-7}$, r is a scalar which indicates a distance between said first and second spacecraft, $e_{12}$ is a unit vector directed towards the first spacecraft from the second spacecraft, x is a vector product operation and · is a scalar product operation;

b) $F_{21} = -F_{12}$; and c) $m_a^l = \begin{bmatrix} m_1^l \\ m_2^l \\ m_3^l \end{bmatrix} = \begin{bmatrix} 0 \\ 0 \\ m_o \end{bmatrix} - GX.$ 10. The method of claim 9, wherein said constant k substantially equals $3\times10^{-7}$ Newton-Ampere$^{-2}$.
11. The method of claim 9, wherein at least one of said first and second magnetic systems includes a coil and said adjusting step includes the step of directing a current through said coil to realize a respective magnetic moment.
12. The method of claim 9, further including the step of sensing a selected one of said first and second magnetic fields to facilitate said adjusting step.
13. The method of claim 12, further including the step of modulating said selected magnetic field to facilitate said sensing step.
14. The method of claim 9, further including the step of transmitting commands between said first and second spacecraft to facilitate said adjusting step.
15. The method of claim 9, wherein said adjusting step includes the step of directing electrical currents through a plurality of coils to realize a respective magnetic moment.

16. The method of claim 15, wherein each of said coils is configured about an axis and said directing step includes the step of arranging the axes of said coils in an orthogonal relationship.
17. The method of claim 15, wherein each of said coils is configured about an axis and said directing step includes the step of arranging the axes of said coils in an orthogonal relationship.
18. The method of claim 9, wherein at least one of said first and second magnetic systems includes a magnet.
19. The method of claim 9, wherein said constant k substantially equals $3\times10^{-7}$ Newton-Ampere$^{-2}$.
20. The method of claim 9, wherein at least one of said first and second magnetic systems includes a coil and adjusting step includes the step of directing a current through said coil to realize a respective magnetic moment.
21. The method of claim 9, further including the step of sensing a selected one of said first and second magnetic fields to facilitate said adjusting step.
22. The method of claim 21, further including the step of modulating said selected magnetic field to facilitate said sensing step.
23. The method of claim 9, further including the step of transmitting commands between said first and second spacecraft to facilitate said adjusting step.
24. The method of claim 9, wherein said adjusting step includes the step of directing electrical currents through a plurality of coils to realize a respective magnetic moment.
25. The method of claim 9, wherein at least one of said first and second magnetic systems inculdes a magnet.
26. A method of maneuvering first and second spacecraft, comprising the steps of:
applying at least one of a first maneuvering force and a first maneuvering torque to said first spacecraft to realize a maneuver of said first spacecraft;
from said first and second spacecraft, projecting first and second magnetic fields to magnetically interact wherein said first and second magnetic fields are respectively represented by first and second magnetic moment vectors;
orienting said first and second magnetic fields to realize a selected arrangement of said first and second magnetic moment vectors and thereby a corresponding application of at least one of a selected second maneuvering force and a selected second maneuvering torque to said second spacecraft to said second spacecraft to realize a maneuver of said second spacecraft;
monitoring said first and second magnetic fields, said first and second magnetic moment vectors, and said selected control force and torque; and
modifying said and second magnetic fields, said first and second magnetic moment vectors, and said selected control force and torque using a closed-loop control law to control a relative position of said first and second spacecraft.
27. The method of claim 26, wherein said closed-loop control law is $m_a^1=$ $$m_a^l = \begin{bmatrix} m_1^l \\ m_2^l \\ m_3^l \end{bmatrix} = \begin{bmatrix} 0 \\ 0 \\ m_o \end{bmatrix} - GX.$$

* * * * *